Feb. 22, 1949.　　　T. S. SCRIBNER　　　2,462,432
POWER SCOOP

Filed Sept. 8, 1945　　　3 Sheets-Sheet 1

INVENTOR.
T. S. Scribner
BY
ATTYS

Feb. 22, 1949.   T. S. SCRIBNER   2,462,432
POWER SCOOP
Filed Sept. 8, 1945   3 Sheets-Sheet 2

INVENTOR.
T. S. Scribner
BY
ATTYS

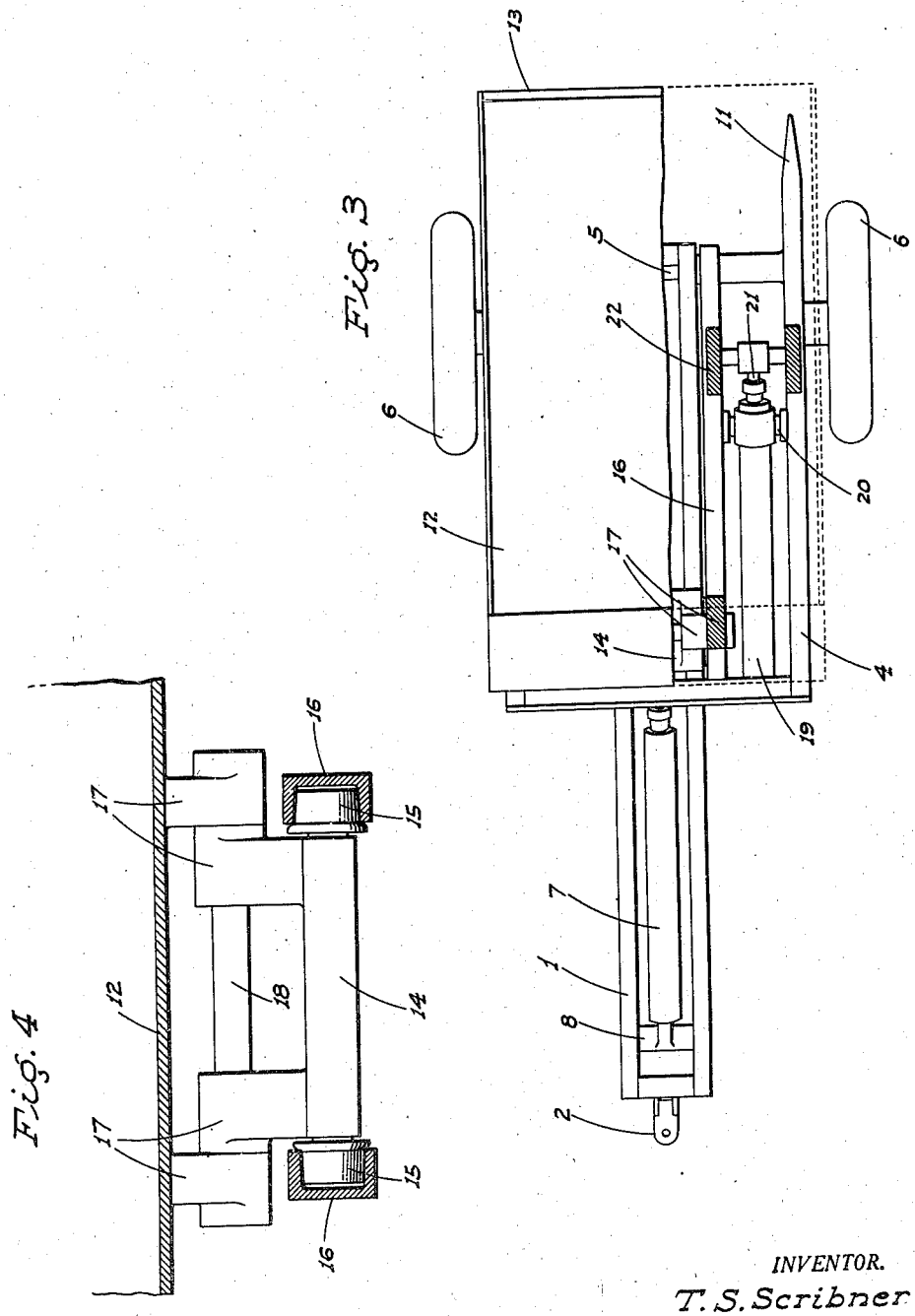

Patented Feb. 22, 1949

2,462,432

UNITED STATES PATENT OFFICE 2,462,432

POWER SCOOP

Thornton S. Scribner, Nevada City, Calif.

Application September 8, 1945, Serial No. 615,210

7 Claims. (Cl. 37—4)

This invention is directed generally to an improved power scoop for handling loose earth, rock, or the like.

In particular the invention relates to, and it is an object to provide, a power scoop which includes a power actuated, scoop-type bowl carried by a mount having spike elements adapted for ground engagement whereby to prevent the bowl from retracting, by reason of the scooping action, from the material being loaded.

A further object of the invention is to provide a power scoop, as above, which comprises, in connection with a main supporting frame adapted for movement along the ground by a tractor or the like, a secondary frame swingably mounted on the main frame and having ground penetrating spike elements on one end thereof operative to anchor the secondary frame upon upward swinging of the same to a predetermined position; there being a power actuated, scoop-type bowl mounted on the secondary frame, and the latter, when in said anchored position, resisting retraction of the bowl as it works against the material to be loaded.

An additional object of the instant invention is to provide a power scoop, as in the preceding paragraph, in which the secondary frame is provided with ground engaging wheels normally supporting the implement above the ground for transport; said wheels being disposed on the secondary frame so that when the same is swung to said anchored position the wheels are clear of the ground, assuring positive penetration of the spike elements thereinto.

A further object of the invention is to provide a power scoop which is especially useful for mine tunnel mucking, or similar operations in close quarters, although the invention may obviously be put to many other uses.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 3 is a plan view of the implement, partly broken away.

Figure 4 is an enlarged, fragmentary cross section showing the carriage mounting for the scoop type bowl.

Referring now more particularly to the characters of reference on the drawings, the implement comprises a relatively narrow, longitudinally extending main frame 1 provided at its forward end with a hitch 2 adapted for connection to a tractor or other draft vehicle, indicated generally at 3.

Figure 1:
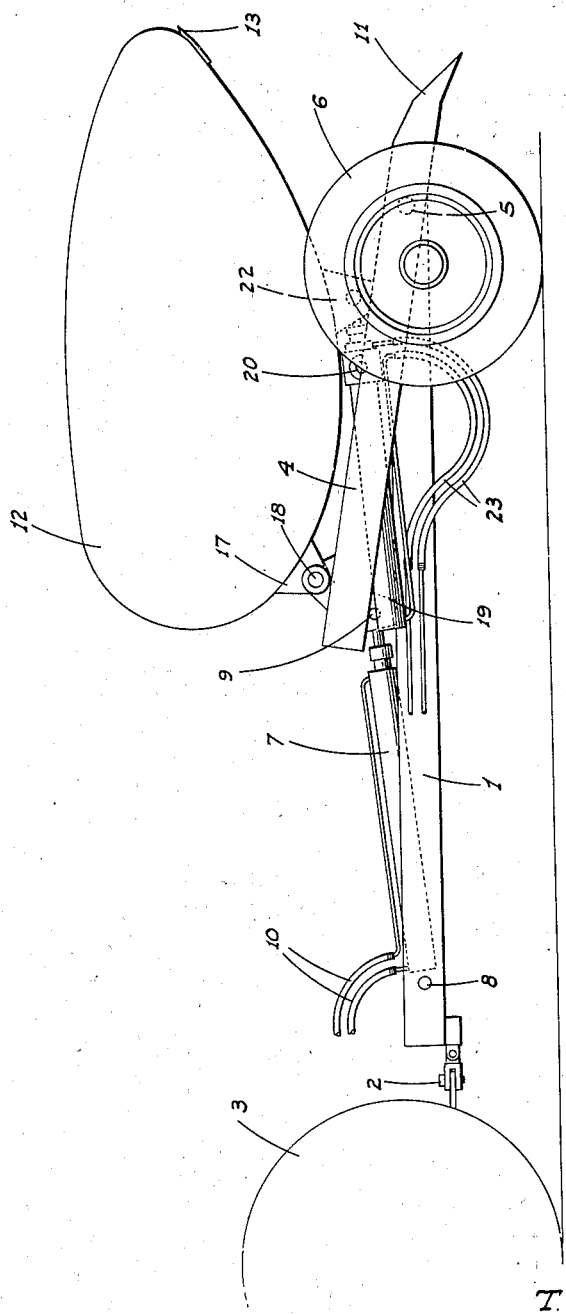
Figure 1 is a side elevation of the implement in transport position.
Figure 2:
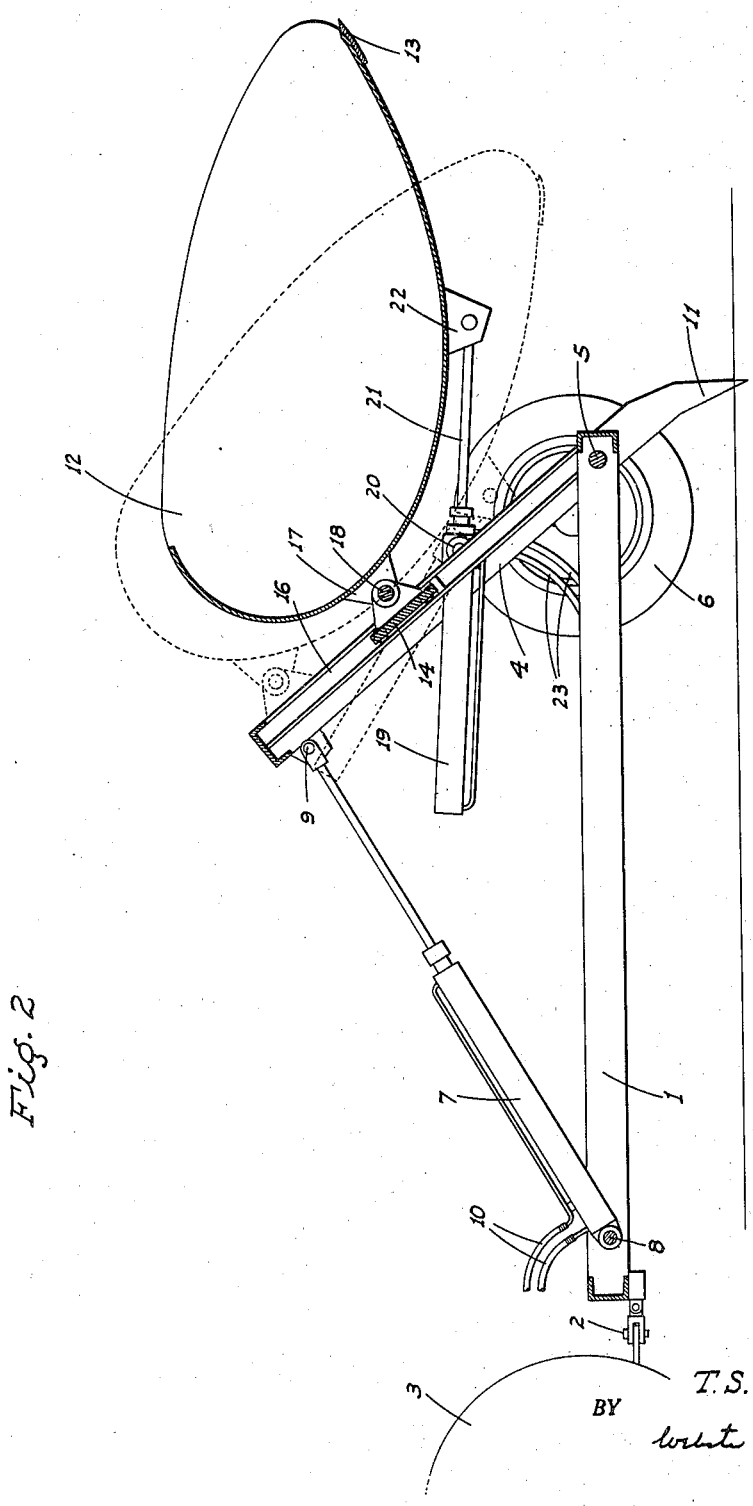
Figure 2 is a longitudinal sectional elevation of the implement in working position.

A substantially rectangular secondary frame 4 symmetrically overhangs the rear end portion of the main frame 1, and at its rear end the secondary frame 4 is pivoted on a transverse axis 5 to the corresponding end of the main frame, whereby said secondary frame is swingable from a lowered position, as in Fig. 1, upwardly and rearwardly to a raised position, as shown in Fig. 2. When in its lowered position such secondary frame 4, as well as the rear of the main frame 1 to which it is pivoted, are supported on wheels 6 which are journaled on the frame 4 forwardly of the pivot 5. The swinging movement of the secondary frame 4 is effected through the medium of a power cylinder 7 pivoted at one end to the main frame 1 as at 8, and at the other end to the secondary frame 4 as at 9. The power cylinder 7 is valve-controlled from the tractor by a fluid pressure system including conduits shown in part at 10.

The secondary frame 4 is fitted, at its rear end, with transversely spaced, normally rearwardly projecting spike elements 11; said spike elements being adapted to penetrate the ground upon upward and rearward swinging movement of the secondary frame to its raised position, as in Fig. 2. The spike elements 11 are of such length that when the secondary frame is in raised position, the wheels 6 are elevated clear of the ground, whereby substantially the entire weight of the implement then rests on said spike elements. In this manner the assembly of the main frame 1 and the secondary frame 4 is effectively anchored, when the latter frame is raised, against advancing movement, i. e. in the direction of the draft vehicle.

A scoop-type bowl 12 is normally disposed above the swinging secondary frame 4; said bowl opening rearwardly, and at its rear edge being fitted with a transverse cutting blade 13. The scoop-type bowl 12 is mounted in connection with the swinging secondary frame 4 in the following manner:

A roller carriage 14 is mounted in the secondary frame 4 and includes rollers 15 running in transversely spaced, channel-shaped side beams 16 of said frame. Cooperating pairs of transversely spaced ears 17, coupled by a cross shaft 18, pivotally connect the forward end portion of the bowl 12 at the bottom to the carriage 14; said carriage normally being disposed adjacent the forward end of said secondary frame 4.

A pair of transversely spaced, fluid pressure power cylinders 19 are transversely pivotally connected, as at 20, to the secondary frame 4 substantially centrally of its ends; the pivots being adjacent the head end of said cylinders and the pistons 21 thereof projecting from said head ends rearwardly to pivotal connection with corresponding ears 22 which depend from the scoop-type bowl 12 at the bottom and substantially centrally of its ends. In the normal lowered position of the secondary frame 4 as in Fig. 1, the cylinders 19 are contracted and the bowl is in carrying position. The power cylinders 19 are simultaneously valve-controlled from the tractor by a fluid pressure system which includes conduits shown in part at 23.

When the implement is in use it is backed up by the draft vehicle 3 until the rear end of said implement is adjacent the pile of material to be loaded. Thereafter, the power cylinder 7 is extended, causing the secondary frame 4 to swing upwardly and rearwardly to raised position, and in which position the spiked elements 11 positively engage in the ground, as hereinbefore explained.

Thereafter the power cylinders 19 are gradually extended, whereupon the bowl traverses a path between the position shown in dotted lines to the position shown in full lines in Fig. 2; i. e. it simultaneously elevates and moves rearwardly at the blade 13, scooping a load of material thereinto. With such movement of the bowl the roller carriage 14 automatically lowers somewhat, as illustrated.

Upon completion of the scooping operation the power cylinders 7 and 19 are substantially simultaneously contracted, whereby to lower the secondary frame 4 and at the same time to shift the bowl to its transport or carrying position; lowering of the secondary frame causing withdrawal of the spike elements 11 from the ground, and engagement of the wheels 6 therewith so that the implement may thereafter move to the point of bowl discharge.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. A power scoop comprising a main frame adapted for movement along the ground, a secondary frame pivoted on the main frame for swinging motion from a normally longitudinally extending lowered position to an upstanding raised position at the rear end of the main frame, ground penetrating means on the secondary frame at its normally rear end, said means penetrating the ground when the secondary frame is in raised position, transversely spaced wheels mounted on the secondary frame ahead of the pivotal axis thereof whereby said wheels elevate above the ground when said secondary frame is in raised position, power means to swing the secondary frame to raised position, a rearwardly facing scoop-like bowl normally disposed above the secondary frame, means mounting the bowl on the secondary frame for rearward scooping motion when said frame is in raised position, and power actuated means connected between the secondary frame and bowl operative to cause such scooping motion of the latter.

2. A power scoop comprising a main frame supported above the ground, a secondary frame pivoted to the main frame adjacent the rear end of the latter, said secondary frame normally lying in a substantially horizontal position and a portion thereof extending to the rear of the main frame and being provided at its rear end with ground engageable elements, means interconnected between the main frame and the secondary frame and operable to swing the secondary frame upwardly from its normal substantially horizontal position and carry the ground engaging elements into engagement with the ground, a carriage mounted to travel along the length of the secondary frame, and normally disposed adjacent the forward end of such secondary frame, a scoop having an open end and a closed end, such scoop being pivoted adjacent its closed end to the carriage with the body of the scoop disposed in a plane substantially parallel to that of the secondary frame, and means interposed between the secondary frame and the scoop and operable to push the open end of the scoop rearwardly and upwardly relative to the secondary frame when the latter is in elevated position.

3. A combination as in claim 15 in which the last named means comprises a hydraulic cylinder pivoted to the secondary frame, a piston rod operable by the cylinder and pivotally connected at its outer end to the scoop rearwardly of the pivotal connection between the scoop and carriage.

4. A power scoop comprising a main frame, means at the front end of such frame for connecting the same with a draft vehicle, a secondary frame pivoted to the rear end of the main frame, such secondary frame normally lying in a substantially horizontal position and a portion thereof extending to the rear of the main frame and being provided at its rear end with ground engageable elements, wheels journaled on the secondary frame forwardly of its pivotal connection with the main frame, such wheels resting on the ground and supporting both frames when the secondary frame is in said normal position, means interconnected between the main frame and secondary frame and operable to swing the forward portion of the same upwardly from its normal substantially horizontal position and carry the ground engageable elements into engagement with the ground and to simultaneously lift the wheels from contact with the ground, a scoop, means movably mounting the scoop on the secondary frame, and means connected between the secondary frame and scoop and operable to move the scoop in a manner to effect loading of the same with material when the secondary frame is in elevated position.

5. A power scoop comprising a supporting vehicle, including a frame, a secondary frame pivoted to the rear end of the vehicle frame and normally lying in a substantially horizontal position, means interconnected between the vehicle frame and secondary frame and operable to swing such secondary frame upwardly from its normal substantially horizontal position, laterally spaced guide rails on the secondary frame, a carriage including rollers arranged to travel the guide rails, a scoop having a closed and open end, means pivotally mounting the scoop on the carriage adjacent the closed end of the scoop, and means interconnected between the secondary frame and the bottom of the scoop to the rear of the pivotal connection between the scoop and carriage and operable to push the open end of the scoop rearwardly and upwardly relative to the secondary frame.

6. A power scoop comprising a supporting frame, means to position such frame in a downwardly and rearwardly inclining position, a carriage mounted for travel up and down said support when so positioned, a scoop having an open end and a closed end and pivoted adjacent its closed end to the carriage, the carriage and closed end of the scoop normally lying adjacent the upper end of the frame when the latter is elevated, and means interconnected between the frame and the scoop at points intermediate the carriage and open end of the scoop and operable to push such open end of the scoop outwardly and upwardly relative to the frame.

7. A structure as in claim 19 in which said last named means comprises a hydraulic cylinder pivotally connected to the frame and a piston rod operable by the cylinder and pivotally connected to the scoop.

THORNTON S. SCRIBNER.

REFERENCES CITED

The following references are of record in the file of this patent:

UNITED STATES PATENTS

| Number | Name | Date |
|---|---|---|
| 2,109,388 | Heller | Feb. 22, 1938 |